United States Patent
Kuo (10) Patent No.: US 7,650,153 B2
(45) Date of Patent: Jan. 19, 2010

(54) SYSTEM AND METHOD FOR TRANSMISSION DIVERSITY STATUS DETECTION

(75) Inventor: Weily Kuo, Tucheng (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 466 days.

(21) Appl. No.: 11/304,709

(22) Filed: Dec. 16, 2005

(65) Prior Publication Data

US 2006/0233139 A1    Oct. 19, 2006

(30) Foreign Application Priority Data

Apr. 14, 2005    (TW) .............................. 94111848 A (51) Int. Cl.
H04W 72/00    (2009.01)
H04L 27/00    (2006.01)

(52) U.S. Cl. .................................. 455/452.2; 375/299
(58) Field of Classification Search .................. 375/299
See application file for complete search history.

(56) References Cited

U.S. PATENT DOCUMENTS

2001/0006531 A1*  7/2001  Okuyama ................... 375/130
2002/0044591 A1*  4/2002  Lee et al. ................... 375/130
2002/0131382 A1   9/2002  Kim et al. .................. 370/335
2004/0028013 A1*  2/2004  Fitton et al. ................ 370/335

\* cited by examiner

*Primary Examiner*—Nick Corsaro
*Assistant Examiner*—Joel Ajayi
(74) *Attorney, Agent, or Firm*—Bacon & Thomas, PLLC (57) ABSTRACT

A system and method for transmission diversity status detection is disclosed, which receives a synchronization channel (SCH) signal and a common pilot channel (CPICH) signal from a base station for detecting whether the base station uses the transmission diversity technique. The transmission diversity status detector detects the transmission diversity status of the base station by detecting the modulation of SCH symbols coherently. The phase references for coherent detection of SCH symbols are extracted from the despreaded CPICH signal. To detect the odd-numbered SCH symbols coherently, the detector applies all phase references of different antennas on odd-numbered SCH symbols and performs selection in the final decision flow. The detector also contains the Time Switched Transmit Diversity (TSTD) filters, designed based on a dependency between the modulation of SCH symbols and the transmit antenna of SCH signals, to improve the signal-to-noise ratio of SCH symbols.

23 Claims, 5 Drawing Sheets

SYSTEM AND METHOD FOR TRANSMISSION DIVERSITY STATUS DETECTION

BACKGROUND OF THE INVENTION

1. Field of the Invention

The invention relates to a detection system and method and, more particularly, to a system and method capable of detecting a transmission diversity technique to be used or not by a base station.

2. Description of Related Art

Wireless communications have played an important role in contemporary living, as applied in cell phone or network systems. However, in a wireless communication system, the channel effect of wireless channel is one of the most important factor affecting the quality and performance of communication. The typical channel effect in wireless communication is multipath fading channel, which can be overcome by many developed techniques. The antenna diversity technique is a simple and effective technique to improve the received signal quality in multipath fading channel. In addition, such a technique is adopted by the specification of Universal Terrestrial Radio Access (UTRA) frequency division duplex (FDD) system. In this system, the received signal quality of a mobile station is increased by use of two-branch transmission diversity at a base station.

However, such a way may relatively increase the system complexity. The specification defines that a base station has an option to use the transmission diversity technique or not. Accordingly, a mobile station has to detect a base station to use the transmission diversity or not when powering on. Such that all data broadcasted by the base station can be received appropriately.

Therefore, it is desirable to provide an improved system and method to mitigate and/or obviate the aforementioned problems.

SUMMARY OF THE INVENTION

The object of the present invention is to provide a system and method for transmission diversity status detection to overcome the prior problems.

In accordance with one aspect of the invention, there is provided a system for transmission diversity status detection, which receives a synchronization channel (SCH) signal and a common pilot channel (CPICH) signal from a base station for detecting whether the base station uses first and second antennas for transmission diversity. The system comprises: a mobile station antenna for receiving signals from the base station, the signals being down converted into baseband signals; a phase reference extractor for extracting first and second phase reference signals from the baseband signal; and a transmission diversity status detector for receiving the SCH symbols to detect the transmission diversity status of the base station by detecting the modulation of SCH symbols coherently.

In accordance with another aspect of the invention, there is provided a method for transmission diversity status detection, which receives a synchronization channel (SCH) signal and a common pilot channel (CPICH) signal from a base station for detecting whether the base station uses first and second antennas for transmission diversity. The method comprises the steps of: (A) receiving signals from the base station, the signals being down converted into baseband signals; (B) extracting first and second phase reference signals from the baseband signal; and (C) receiving the SCH symbols to detect the transmission diversity status of the base station by detection modulation of SCH symbols coherently.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
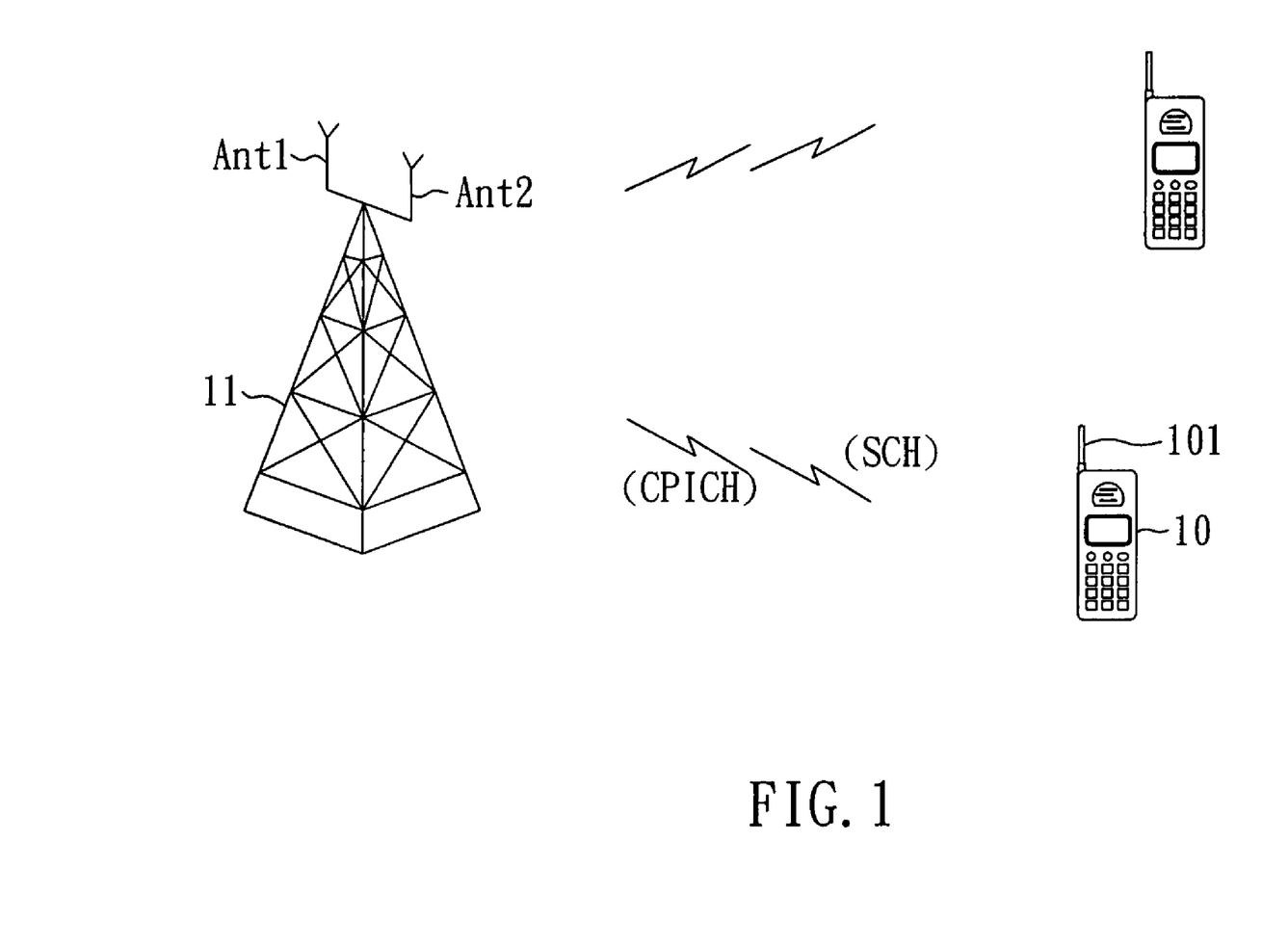
FIG. 1 is a schematic diagram of a communication system according to an embodiment of the invention.

The invention can be used in various communication technologies, especially in Universal Terrestrial Radio Access (UTRA) frequency division duplex (FDD) systems. FIG. 1 is a schematic diagram of a communication system according to an embodiment of the invention. A mobile station has to search for a base station 11 when performing cell search procedure. In this case, the mobile station 10 receives a synchronization channel (SCH) signal and a common pilot channel (CPICH) signal for timing synchronization and scrambling code matching. Next, the mobile station 10 is allowed to receive system broadcast information through a primary common control physical channel (PCCPCH). When the base station 11 uses the transmission diversity technique, the PCCPCH is transmitted using space time block coding based transmit diversity (STTD). Before demodulating PCCPCH, the mobile station 10 is required to detect the presence or absence of STTD encoding on the PCCPCH.

Figure 2A:
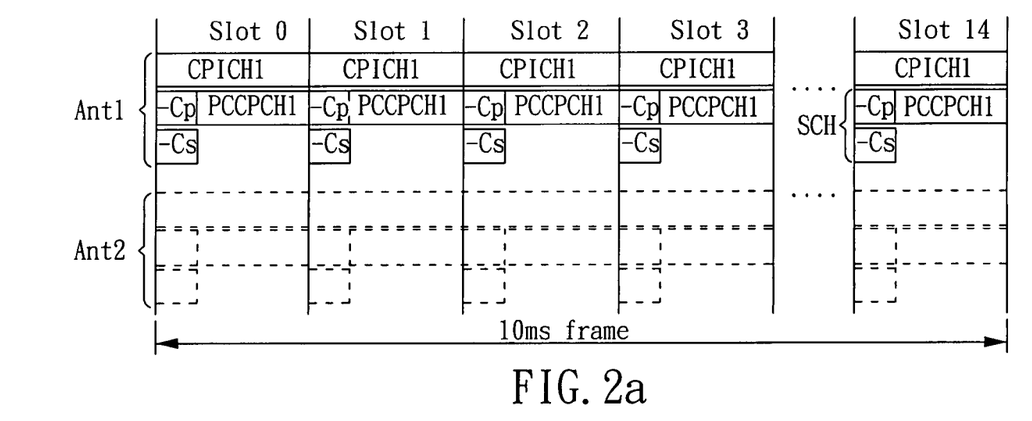
FIG. 2a is a frame structure of CPICH, PCCPCH and SCHs transmitted by non-transmission diversity scheme.

FIG. 2a is a frame structure of CPICH, PCCPCH and SCHs transmitted by non-transmission diversity scheme. All channels are transmitted from Ant1 and no signal is transmitted from Ant2. The SCH consists two sub channels, Primary and Secondary SCH. In non-transmission diversity scheme case, a −1 modulated Primary Synchronization Code (PSC), denoted as −Cp, is transmitted in Primary SCH and a −1 modulated Secondary Synchronization Code (SSC), denoted as −Cs, is transmitted in Secondary SCH.

Figure 2B:
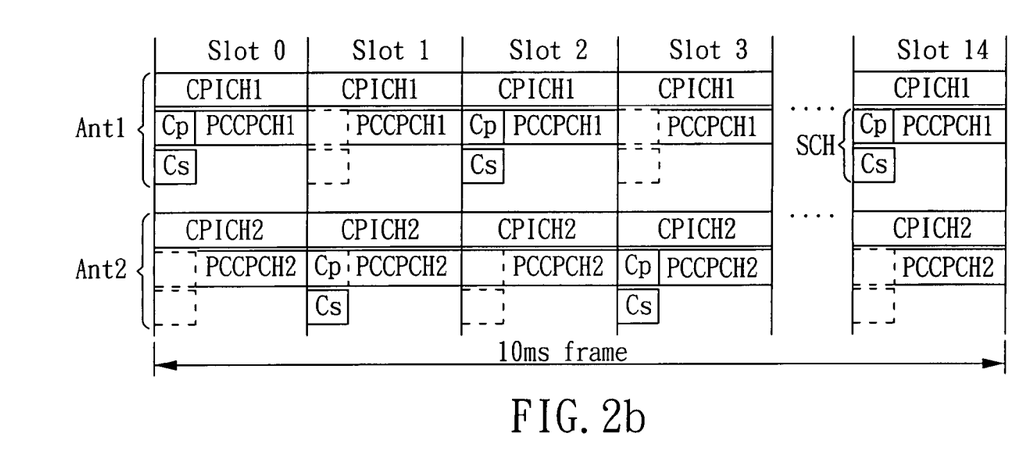
FIG. 2b is a frame structure of CPICH, PCCPCH and SCHs transmitted by two-branch transmission diversity scheme.

FIG. 2b is a frame structure of CPICH, PCCPCH and SCHs transmitted by two-branch transmission diversity scheme. The CPICH is transmitted from Ant1 and Ant2 using different pre-defined pilot pattern for both antennas. The SCHs are transmitted by the Time Switched Transmit Diversity (TSTD) scheme. Both Primary and Secondary SCHs are transmitted from Ant1 in even numbered slots, and both SCHs are transmitted from Ant2 in odd numbered slots. In this transmission diversity case, non-modulated PSC and SSC, denoted as Cp and Cs, are transmitted in Primary and Secondary SCHs respectively.

Figure 3:
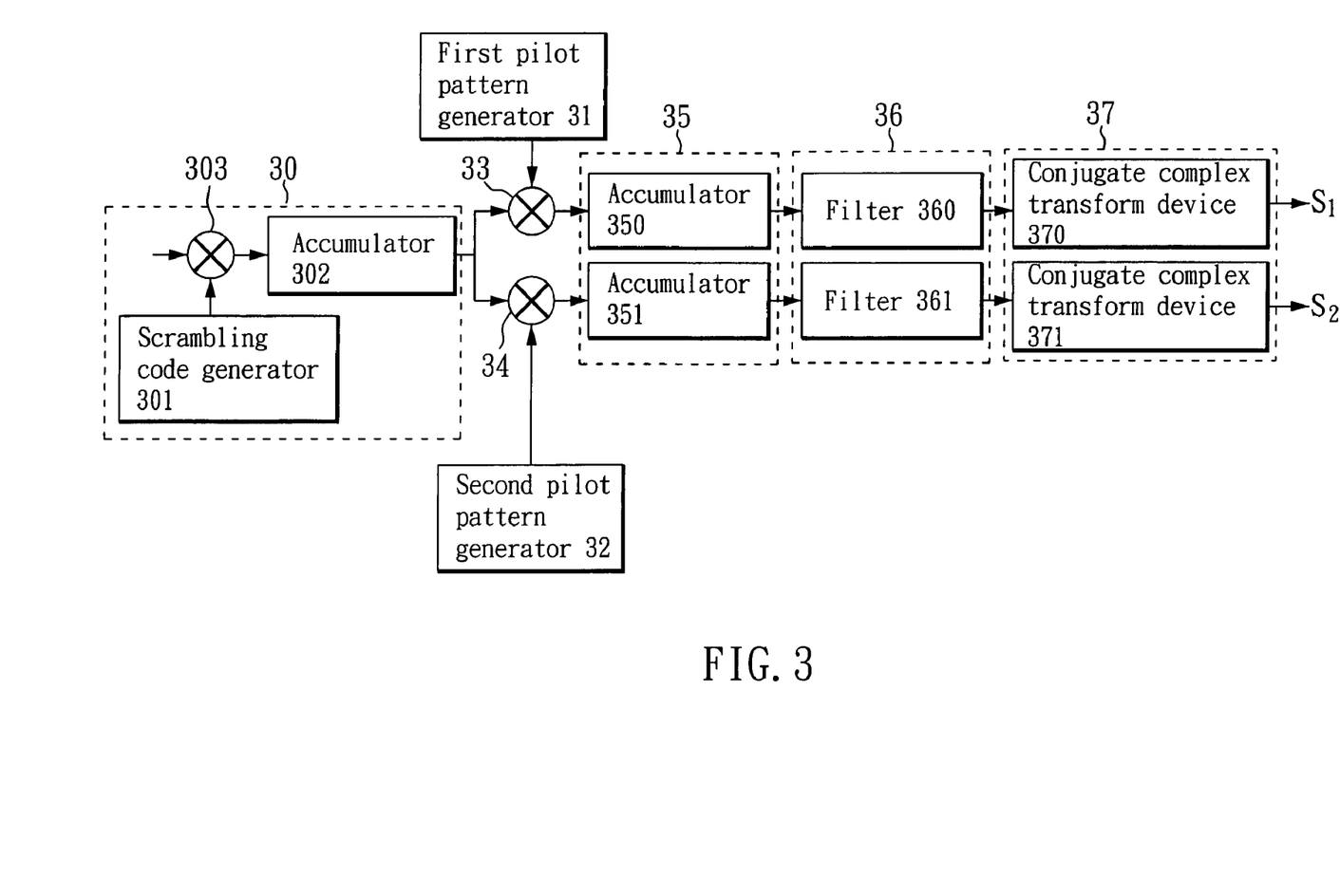
FIG. 3 is a block diagram of a phase reference extractor according to an embodiment of the invention.

FIG. 3 is a block diagram of a phase reference extractor according to an embodiment of the invention. Phase references of the corresponding channel effects can be extracted by many existing approaches. The phase reference extractor of FIG. 3 is only one of the typical approaches. The signal is received by the antenna 101 of the mobile station 10 and down converted to baseband signal. The baseband signal is despreaded by a despreading unit 30 to obtain the despreaded CPICH symbol. The despreading unit 30 contains a scrambling code generator 301 which generates scrambling code of desired cell, a complex multiplier 303 for multiplying the baseband signal by the scrambling code, and an accumulator 302 for accumulating output of the complex multiplier 303.

After dispreading process, the despreaded CPICH symbol is applied to multipliers 33 and 34 for being multiplied by the CPICH pilot pattern of Ant1 and Ant2 generated by pilot pattern generator 31 and 32 respectively, so as to produce de-patterned CHICH symbols. The multiplier 33 and 34 are complex multipliers. The de-patterned CPICH symbols are accumulated by accumulators 350 and 351. The despreaded CPICH symbols, transmitted from different antennas, can be separated by the above de-pattern and accumulation process. Next, the outputs of the accumulators 350 and 351 are filtered by filters 360 and 361, respectively, to improve the signal-to-noise ratio of CPICH signals. The outputs of the filters 360 and 361 are applied to the conjugate complex transform devices 370 and 371, respectively, to extract the complex conjugation of the outputs of the filters 360 and 361, thereby obtaining the phase references $S_1$ and $S_2$ of propagation channels from Ant1 and Ant2.

Figure 4:
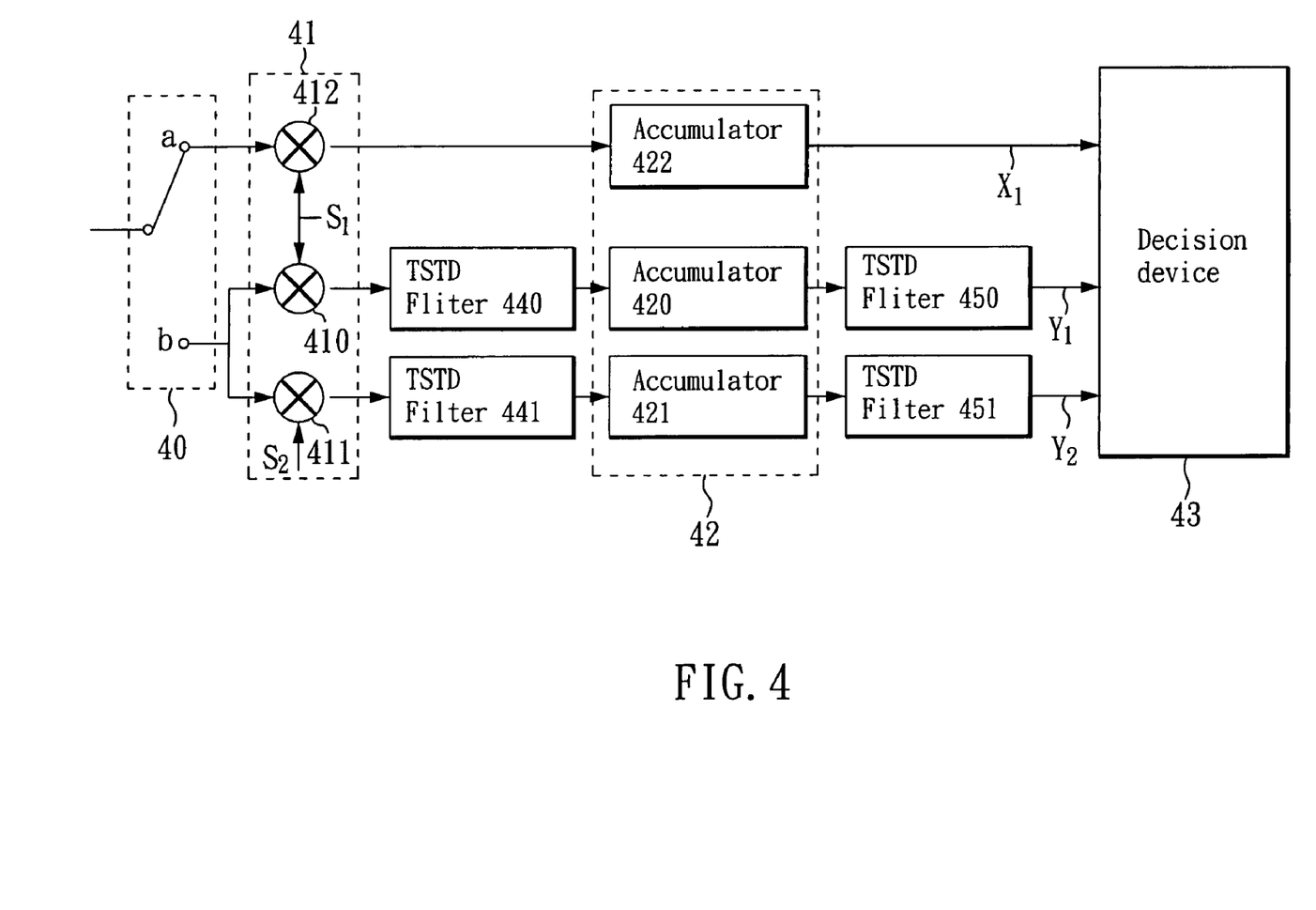
FIG. 4 is a block diagram of a transmission diversity status detector according to an embodiment of the invention.

FIG. 4 is a block diagram of a transmission diversity status detector according to an embodiment of the invention. The detector detects the transmission diversity status of base station 11 by detecting the modulation of SCH coherently. The signal is received by the antenna 101 of the mobile station 10 and down converted to baseband signal. The baseband signal is despreaded by PSC and/or SSC to obtain the despreaded Primary and/or Secondary SCH symbols. The despreaded Primary, Secondary or sum of both SCH symbols can be the input of the detector. The slot switch 40 passes the despreaded SCH symbols in different slots into different process nodes. The slot switch 40 is switched to node 'a' in even numbered slots and switched to node 'b' in odd numbered slots. The channel effect compensator 41 is used to remove the propagation channel effects that the despreaded SCH symbols suffer from. The channel effect compensator 41 contains three complex multipliers 410, 411 and 412. The accumulator bank 42 is used to accumulate the despreaded SCH symbols in different slots to increase the signal-to-noise ratio of the despreaded SCH symbols.

The despreaded SCH symbols in even numbered slots are applied to multiplier 412 for being multiplied by the phase reference signal $S_1$ and accumulated by accumulator 422 to obtain accumulated signal $X_1$. The accumulated signal $X_1$ is passed into the decision device 43 for transmission diversity status detection.

The despreaded SCH symbols in odd numbered slots are applied to multiplier 410 for being multiplied by the phase reference signal $S_1$ and passed into a TSTD filter 440, accumulator 420 and a TSTD filter 450 respectively for being filtered and accumulated, thereby producing processed signal $Y_1$. The processed signal $Y_1$ is passed into the decision device 43 for transmission diversity status detection. The despreaded SCH symbols in odd numbered slots are applied to multiplier 411 for being multiplied by the phase reference signal $S_2$ and passed in a TSTD filter 441, accumulator 421 and a TSTD filter 451 respectively for being filtered and accumulated, thereby producing processed signal $Y_2$. The processed signal $Y_2$ is passed into the decision device 43 for transmission diversity status detection.

The TSTD filters 440, 441, 450 and 451 are used to improve the signal-to-noise ratio of SCH symbols in odd numbered slots. Alternatively, it is applicable to use only TSTD filters 440 and 441, or only TSTD filters 450 and 451 to improve the signal-to-noise ratio of SCH symbols. These filters 440, 441, 450 and 451 are designed based on a dependency between the modulation of SCH symbols and the transmit antenna of SCH signals. The dependency is that −1 modulated SCH symbols are always transmitted from Ant1 and non-modulated SCH symbols are always transmitted from Ant2. A design example of TSTD filters 440, 441, 450 and 451 is explained as below. The input and output relationship of TSTD filters 440 and 450 can be expressed as:

$$\text{Output} = \begin{cases} \text{Input}, & \text{if Input} \leq 0 \\ 0, & \text{otherwise.} \end{cases}$$

The input and output relationship of TSTD filters 441 and 451 can be expressed as:

$$\text{Output} = \begin{cases} \text{Input}, & \text{if Input} \geq 0 \\ 0, & \text{otherwise.} \end{cases}$$

Figure 5:
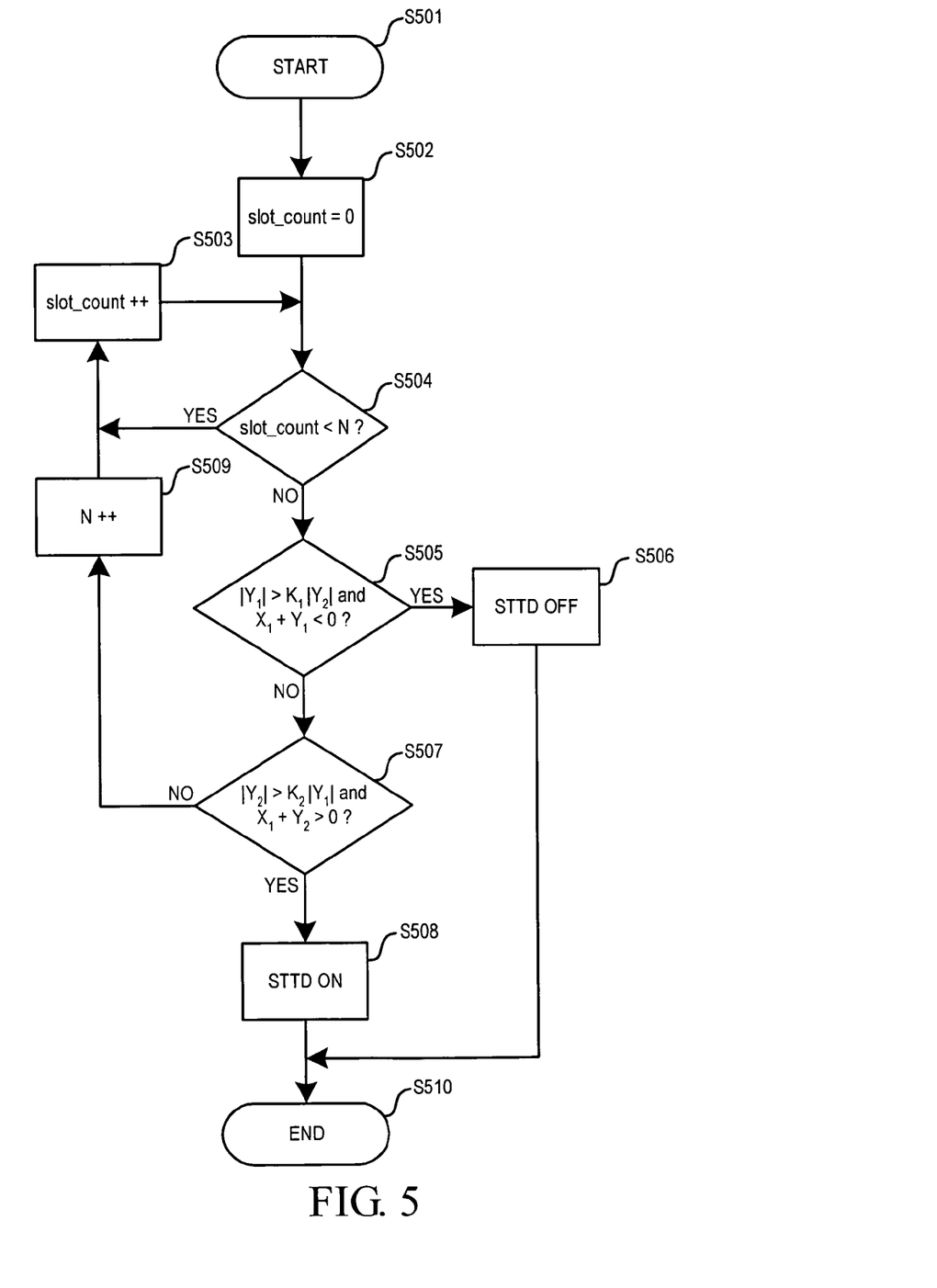
FIG. 5 is a flowchart of a transmission diversity status decision device according to an embodiment of the invention.

FIG. 5 is a flowchart of a transmission diversity status decision device according to an embodiment of the invention. As shown in FIG. 5, the decision device 43 is started to detect the transmission diversity status after N slot detection signals are accumulated by the accumulators 420-422 (S502~S504), where N is a pre-defined slot number to ensure enough SNR of SCH signals are acquired. Steps S505 and S507 determine whether the transmission diversity technology is used in base station. If the conditions of $|Y_1|>K_1|Y_2|$ and $X_1+Y_1<0$ are fulfilled, the transmission diversity status is decided as OFF (S506). If the conditions of $|Y_2|>K_2|Y_1|$ and $X_1+Y_2>0$ are fulfilled, the transmission diversity status is decided as ON (S508). $|Y_1|$ means the absolute value of $Y_1$. $K_1$ and $K_2$ are pre-defined bias factors of received SCH signals in odd slots and used to increase the detection accuracy. If the results of both decision steps S505 and S507 are NO, the outcome of transmission diversity status will not be produced in current slot. The value of N will be increased by one and the same decision flow will be executed again in next slot (S509).

Although the present invention has been explained in relation to its preferred embodiment, it is to be understood that many other possible modifications and variations can be made without departing from the spirit and scope of the invention as hereinafter claimed.

What is claimed is:

1. A system for transmission diversity status detection, which receives a synchronization channel (SCH) signal and a common pilot channel (CPICH) signal from a base station for detecting whether the base station uses first and second antennas for transmission diversity, the system, comprising:
   a mobile station antenna for receiving signals from the base station, the signals being down converted into baseband signals, the baseband signals being despreaded to obtain SCH symbols and CPICH symbols;
   a phase reference extractor for extracting first and second phase reference signals from the baseband signal; and
   a transmission diversity status detector for receiving the SCH symbols to detect the transmission diversity status of the base station by detecting the modulation of SCH symbols coherently, the transmission diversity status detector having:

a slot switch for passing the SCH symbols in even numbered slots or in odd numbered slots;

a channel effect compensator for removing propagation channel effects that the SCH symbols suffer from;

an accumulator bank for accumulating the SCH symbols in different slots to increase signal-to-noise ratio of the SCH symbols; and a decision device for detecting the transmission diversity status based on outputs of the accumulator bank.

2. The system as claimed in claim 1, wherein the phase reference extractor further comprises:

a despreading unit for dispreading the baseband signal to obtain the CINCH symbols;

first and second pilot pattern generators for generating CPICH pilot patterns of the first and second antennas;

first and second multipliers for multiplying the CPICH symbols by the CPICH pilot patterns of the first and a second antennas, respectively, to obtain two de-patterned OPICH symbols;

first and second accumulators for accumulating the de-patterned CPICH symbols, respectively;

first and second filters for filtering outputs of the accumulators, respectively; and first and second conjugate complex transform devices for extracting complex conjugation of outputs of the first and second filters, respectively, thereby obtaining the first and second phase reference signals.

3. The system as claimed in claim 2, wherein the despreading unit further comprises a scrambling code generator which generates scrambling code of a desired cell, a third multiplier for multiplying the baseband signal by the scrambling code, and a third accumulator for accumulating output of the third multiplier.

4. The system as claimed in claim 2, wherein the first, second and third multipliers are complex multipliers.

5. The system as claimed in claim 1, wherein the accumulator bank includes fourth, fifth and sixth accumulators.

6. The system as claimed in claim 1, wherein the channel effect compensator further comprises:

a fourth multiplier for multiplying the SCH symbols in even numbered slots by the first phase reference signal, which is then accumulated by the fourth accumulator to obtain accumulated signal for being passed into the decision device for transmission diversity status detection;

a fifth multiplier for multiplying the SCH symbols in odd numbered slots by the first phase reference signal, which are then passed into the fifth accumulator for being accumulated, thereby producing first processed signal for being passed into the decision device for transmission diversity status detection; and a sixth multiplier for multiplying the SCH symbols in odd numbered slots by the second phase reference signal, which are then passed into the sixth accumulator for being accumulated, thereby producing second processed signal for being passed into the decision device for transmission diversity status detection.

7. The system as claimed in claim 6, wherein the transmission diversity status detector further comprises:

a first TSTD filter for filtering multiplied SCH symbols output from the fifth multiplier; and a second TSTD filter for filtering the multiplied SCH symbols output from the sixth multiplier.

8. The system as claimed in claim 7, wherein the TSTD filters are designed based on a dependency between the modulation of SCH symbols and the first and second antennas for transmitting SCH signals, such that that −1 modulated SCH symbols are always transmitted from the first antenna and non-modulated SCH symbols are always transmitted from the second antenna.

9. The system as claimed in claim 7, wherein the transmission diversity status detector further comprises:

a third TSTD filter for filtering the accumulated SCH symbols output from the fifth accumulator; and a fourth TSTD filter for filtering the accumulated SCH symbols output from the sixth accumulator.

10. The system as claimed in claim 9, wherein the TSTD filters are designed based on a dependency between the modulation of SCH symbols and the first and second antennas for transmitting SCH signals, such that that −1 modulated SCH symbols are always transmitted from the first antenna and non-modulated SCH symbols are always transmitted from the second antenna.

11. The system as claimed in claim 6, wherein the transmission diversity status detector further comprises:

a third TSTD filter for filtering the accumulated SCH symbols output from the fifth accumulator; and a fourth TSTD filter for filtering the accumulated SCH symbols output from the sixth accumulator.

12. The system as claimed in claim 11, wherein the TSTD filters are designed based on a dependency between the modulation of SCH symbols and the first and second antennas for transmitting SCH signals, such that that −1 modulated SCH symbols are always transmitted from the first antenna and non-modulated SCH symbols are always transmitted from the second antenna.

13. The system as claimed in claim 6, wherein the fourth, fifth and sixth multipliers are complex multipliers.

14. The system as claimed in claim 1, wherein the decision device determines that the transmission diversity is not used by the base station if both conditions of $|Y_1|>K_1|Y_2|$ and $X_1+Y_10$ are fulfilled, and that the transmission diversity is used by the base station if both conditions of $|Y_2|>K_2|Y_1|$ and $X_1+Y_2>0$ are fulfilled, where $X_1$ represents the accumulated signal, $Y_1$ and $Y_2$ represent the first and second processed signals, respectively, and $K_1$ and $K_2$ are pre-defined bias factors of received SCH symbols in odd slots.

15. The system as claimed in claim 14, wherein the decision device detects the transmission diversity status after N slot detection signals are accumulated by the fourth, fifth and sixth accumulators, where N is a pre-defined slot number.

16. The system as claimed in claim 14, wherein, if all the conditions are not fulfilled, value of N is increased and the conditions are checked again to detect transmission diversity status of the base station.

17. A method for transmission diversity status detection, which receives a synchronization channel (SCH) signal and a common pilot channel (CPICH) signal from a base station for detecting whether the base station uses first and second antennas for transmission diversity, the method comprising the steps of (A) receiving signals from the base station, the signals being down converted into baseband signals, the baseband signals being despreaded to obtain SCH symbols and CPICH symbols;

(B) extracting first and second phase reference signals from the baseband signal; and (C) receiving the SCH symbols to detect the transmission diversity status of the base station by detecting the modulation of SCH symbols coherently, which includes:

(C1) passing the SCH symbols in even numbered slots or in odd numbered slots; and (C2) removing propagation channel effects that the SCH symbols suffer from:

(C3) accumulating the SCH symbols in different slots to increase signal-to-noise ratio of the SCH symbols; and (C4) detecting the transmission diversity status based on outputs of the step (C3).

18. The method as claimed in claim 17, wherein step (B) further comprises the steps of:

(B1) despreading the baseband signal to obtain the CINCH symbols;

(B2) generating CPICH pilot patterns of the first and second antennas;

(B3) multiplying the CINCH symbols by the CPICH pilot patterns of the first and a second antennas, respectively, to obtain two de-patterned CPICH symbols;

(B4) accumulating the de-patterned CPICH symbols;

(B5) filtering outputs of the accumulators; and (B6) extracting complex conjugation of outputs of the first and second filters to obtain the first and second phase reference signals.

19. The method as claimed in claim 18, the step (B1) further comprises the steps of:

(B11) generating scrambling code of a desired cell;

(B12) multiplying the baseband signal by the scrambling code; and (B13) accumulating output of step (B12).

20. The method as claimed in claim 17, wherein the step (C2) further comprises the steps of:

(C21) multiplying the SCH symbols in even numbered slots by the first phase reference signal, which are then accumulated to obtain accumulated signal;

(C22) multiplying the SCH symbols in odd numbered slots by the first phase reference signal, which are then filtered and accumulated to produce first processed signal; and (C23) multiplying the SCH symbols in odd numbered slots by the second phase reference signal, which are then filtered and accumulated to produce second processed signal.

21. The method as claimed in claim 20, wherein the step (C2) determines that the transmission diversity is not used by the base station if both conditions of $|Y_1|>K_1|Y_2|$ and $X_1+Y_1>0$ are fulfilled, and that the transmission diversity is used by the base station if both conditions of $|Y_2|>K_2|Y_1|$ and $X_1+Y_2>0$ are fulfilled, where $X_1$ represents the accumulated signal, $Y_1$ and $Y_2$ represent the first and second processed signals, respectively, and $K_1$ and $K_2$ are pre-defined bias factor of received 5011 symbols in odd slots.

22. The method as claimed in claim 21, wherein the transmission diversity status is detected after N slot detection signals are accumulated, where N is a pre-defined slot number.

23. The method as claimed in claim 21, wherein, if all the conditions are not fulfilled, value of N is increased and the conditions are checked again to detect transmission diversity status of the base station.

* * * * *

UNITED STATES PATENT AND TRADEMARK OFFICE
CERTIFICATE OF CORRECTION

PATENT NO. : 7,650,153 B2
APPLICATION NO. : 11/304709
DATED : January 19, 2010
INVENTOR(S) : Weily Kuo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Twenty-eighth Day of December, 2010

David J. Kappos
*Director of the United States Patent and Trademark Office*